United States Patent Office.

SAMUEL EVAN JOHNSON, JR., OF BROOKLYN, NEW YORK.

Letters Patent No. 96,324, dated November 2, 1869.

IMPROVED TROCHE.

The Schedule referred to in these Letters Patent and making part of the same.

I have invented a certain Lozenge or Compound, called "I. D. Smith & Co. Troche," to be used in the cure of catarrhs, coughs, and other bronchial diseases.

The nature of my invention consists in the mixing of pulverized cubebs, sugar, gum-tolu, gum-arabic, extract of licorice, oil of aniseed and sassafras, in the following proportions:

Pulverized cubebs, eight parts.
Sugar, confectioned, four parts.
Gum-tolu, two parts.
Pulverized gum-arabic, ten parts.
Pulverized extract of licorice, ten parts.
Oil of almonds and sassafras, sufficient to flavor.

The foregoing ingredients, in the quantities and proportions here stated, compose an eight-grain lozenge or troche.

Claim.

I claim, as my invention—

The manufacture or preparation of a compound, which I denominate "I. D. Smith & Co. Troche," of the ingredients, in the proportions, and for the purposes set forth.

S. E. JOHNSON, JR.

Witnesses:
   GEO. D. RAMSAY,
   RICH. F. BUTT.